United States Patent [19]

Meuret

[11] 4,063,831
[45] Dec. 20, 1977

[54] BOLTED JOINT

[75] Inventor: Paul Meuret, La Seyne-sur-Mer, France

[73] Assignee: Constructions Navales et Industrielles de la Mediterranee, Paris, France

[21] Appl. No.: 582,414

[22] Filed: May 28, 1975

[30] Foreign Application Priority Data

May 28, 1974 France .............................. 74.18377

[51] Int. Cl.² .............................................. F16C 9/00
[52] U.S. Cl. ........................................ 403/28; 176/87; 29/446; 220/327
[58] Field of Search ............... 403/28, 29; 220/3, 327, 220/328; 176/36, 87; 29/446, 526; 52/758 F

[56] References Cited

U.S. PATENT DOCUMENTS

| 2,571,265 | 10/1951 | Leufven | 29/446 UX |
| 2,888,292 | 5/1959 | Shoessow | 220/327 X |
| 2,910,933 | 11/1959 | Danly | 29/447 X |
| 3,055,538 | 9/1962 | Shoessow | 176/87 UX |
| 3,197,218 | 7/1965 | Coulter | 220/327 X |
| 3,291,509 | 12/1966 | Borsum et al. | 220/327 X |
| 3,654,691 | 4/1972 | Willhite et al. | 29/446 X |
| 3,792,933 | 2/1974 | Stencel | 29/446 X |
| 3,836,429 | 9/1974 | Frisch et al. | 176/30 X |

Primary Examiner—Wayne L. Shedd
Attorney, Agent, or Firm—Wenderoth, Lind & Ponack

[57] ABSTRACT

A device for connecting body members of pressure vessels, such as the covers of nuclear reactor pressure vessels, especially to permit the rapid removal and fitting of lids or covers of such pressure vessels, includes a stud bolt to be mounted in one of the members while passing through an aperture in an adjacent member, the bolt being provided with a head and a clamping nut, a metal member adapted to fit between the adjacent member and the head, and means for heating the metal member to cause expansion thereof against the head to allow tightening and release of the clamping nut.

16 Claims, 2 Drawing Figures

BOLTED JOINT

BACKGROUND OF THE INVENTION

This invention relates to a device intended for connection of body members of pressure vessels, especially to permit the rapid removal and fitting of lids or covers of pressure vessels, such as the covers of nuclear reactor pressure vessels.

It is commonly desired to rapidly fit or dismantle the covers for the pressure vessels or pressurized light water reactors, which frequently operate at pressures of approximately 150 bars. For this purpose, it is necessary to rapidly disconnect or connect the flange of the cover from or to that of the vessel, these flanges being connected together by a very large bolting system. This system is generally composed of stud bolts set in the flange of the pressure vessel, onto which there are screwed nuts which press the cover against the vessel and squeeze an intermediate seal. In a pressurized water reactor of 900 Mw, for example, these stud-bolts may be 58 in number and typically have a diameter of approximately 150 mm and a length of approximately 1 meter.

The very high tightening torque which must be exerted does not generally permit the nuts to be tightened up in the conventional manner. One possible technique which has long been used, for example for tightening up of turbine half-casings, consists of pulling the stud-bolt by using a hydraulic jack which bears against the flange of the cover, and of then bringing up the nut against the cover. After the bolt has been released, the nut holds the tension which was temporarily exerted by the jack.

However, in the case of a structure such as pressurised water reactor, the use of a sealing joint or gasket which is of metal, and, therefore, very hard, means that it is necessary to fit or to dismantle almost simultaneously all the nuts, if it is desired to avoid deformations in the flanges, which would be induced by the reaction force of the seal.

The need for covers of nuclear reactor pressure vessels to be capable of being rapidly dismantled and refitted is due to the fact that it is desirable to limit the maximum possible extent the shut-down time of the power station. A power station (or section thereof) of 900 Mw capacity costs approximately U.S. $0.25/Watt installed capcity. The cost of the power station when shut-down can be estimated as approximately U.S. $250,000 a day. Since this shut-down normally occurs once per year, it is easy to understand the advantage of requiring only one day, instead of three days, for dismantling or refitting the cover of the pressure vessel.

Whereas the forces to be produced may be very high in order to stress the stud-bolts, for example of the order of 500 tons per bolt in a pressurized water reactor of 900 Mw capacity, the distance of travel involved is small, of the order of a few millimeters.

The devices at present in use for the dismantling or refitting of the covers of nuclear reactor pressure vessels are essentially based on the use of high pressure hydraulic jacks.

This technique does not provide a satisfactory answer, in that there are several major disadvantages:

since the stud-bolts are normally very close to one another, this restricts the permitted bulk opposite to a bolt and requires the use of jacks and stud-bolts of contorted shape. In particular, the stud-bolts have to be specially machined to permit the use of this type of mechanism, and their replacement must be planned in advance if this technique is envisaged for use latter on an existing power station;

there is a risk of escape of oil from the jacks or hydraulic circuits, which can pollute the equipment, the water of the pressure vessel and the environment. The risk of these leakages in increased by the fact that the mechanism is used only occasionally;

certain components, in particular the elastomer seals of the jacks, cannot withstand the high radiation doses originating from the reactor core, nor the temperature of the cover when the reactor is in operation, which means that the mechanism has to be mounted and dismantled during each recharging of the reactor;

the removal (sometimes necessitated) of a portion of the bolts before the cover is raised, becomes a very difficult matter, in view of the fact that the jacks bear above the bolts.

SUMMARY OF THE INVENTION

According to the invention, there is provided a device for connecting body members of pressure vessels which comprises a stud bolt to be mounted in one of the members while passing through an aperture in an adjacent member, the bolt being provided with a head and a clamping nut, a metal member adapted to fit between the adjacent member and the head, and means for heating the metal member to cause expansion thereof against the head to allow tightening and release the clamping nut. Expansion of the metal member causes stretching of the bolt and slackening of the nut, which may then be retightened or released as required.

BRIEF DESCRIPTION OF THE DRAWINGS

A preferred embodiment of the invention will be described, by way of example, with reference to the accompanying drawing in which.

DETAILED DESCRIPTION OF THE INVENTION

Figure 1:
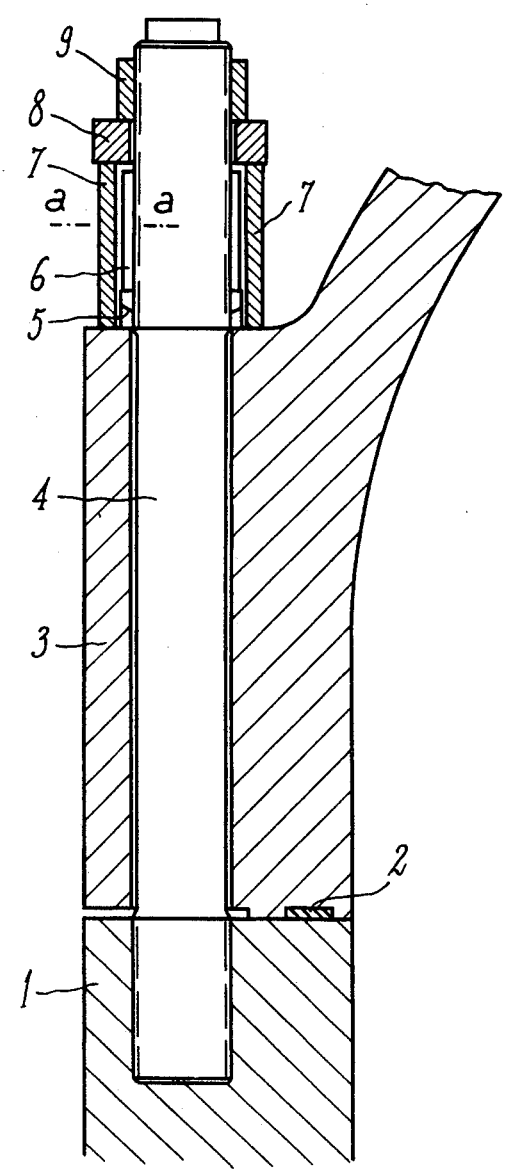
FIG. 1 is a partial vertical section of a pressure vessel and a cover therefore.

Referring to FIG. 1, a pressure vessel is provided with a flange 1 and the vessel cover with a flange 3, with a sealing joint 2 inserted between the flanges 1 and 3. The cover is held in place on the vessel by means of stud bolts such as 4, on which are screwed locking nuts 6 bearing against the washers 5, and head nuts 9.

Figure 2:
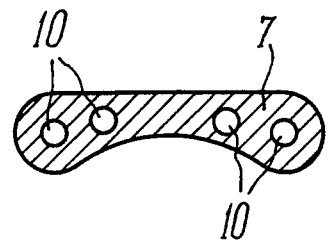
FIG. 2 is a section along a—a of FIG. 1.

There are provided, one on each side of the stud-bolts 4, two bars 7 of high strength, high expansion stainless steel, for example of treated Z 5N C D T V 25-15. These bars 7 are inserted between the flange 3 of the cover and a cross-member 8 fitted beneath the head nut 9. The bars are of approximately 300 mm in depth, and each weighs about 20 kg. Their cross-section is of generally kidney-shape (FIG. 2). Each is equipped with a certain number of holes 10, intended for receiving heating elements, for example electrical resistance heaters, for the purpose of direct heating.

In order to reduce the escape of heat from the bars, which would adversely affect the consumption of electricity and the time required for raising them to the desire temperature, the bars are externally faced with a thermal insulator (for example aluminium metallisation). It will be noticed that a small amount of heat escaping towards the stud-bolt 4 is desirable, since expansion of this bolt is beneficial. It should however not be imagined that it is sufficient to directly heat the bolt 4 in order to achieve the desired result. Not only would it be very inadvisable to raise this treated component, which has been subjected to exact manufacture, to a high temperature, but it is difficult to see how the necessary temperature gradient could be obtained between the cover flange and that portion of the stud-bolt situated therein, in view of the "thermal bridges" formed by the setting of the bolt in the pressure vessel flange and the nut retaining the cover flange. The arrangement required would be so complicated and bulky that the safety and simplicity of components, necessitated by the very nature of the tighteningup to be effected, would be seriously compromised.

In the embodiment described here, allowing for elastic compression under force, it is at a temperature of 350°–400° C that the bars sufficiently raise the upper nut 9 screwed onto the head of the stud-bolt (soley for the purpose of enabling the nut 6 to be tightened). This temperature, reached for example after about half an hour, is considerably below the usual creep temperatures as measured for 10,000 hours minimum operating time. Such creep temperature is never achieved in the present operation.

It will be seen that the disadvantages set out above, inherent in hydraulic systems, disappear using the arrangement of the drawings.

The completely inert devices may be permanently installed on the cover and do not require any maintenance. It is possible to dismantle the entirety of a portion of the stud-bolts without removing the cover and without the need to dismantle anything else.

The electrical resistances contained in holes 10 may be three to four in number, so that failure of one of them does not prevent the required temperature from being attained, although it may be reached a little more slowly.

The protection provided on the external surfaces of the bars has a two-fold function:
to limit the loss of heat;
to insulate electrically the bars from surrounding materials, so that accidental earthing of one of the heating elements cannot endanger personnel.

The hardness of this protection is such that it enables forces to be transmitted from the top to the bottom of the bars without risk of failure.

What I claim is:

1. A system for securing a cover to and releasing such cover from a pressure vessel, said system comprising:
   at least one stud bolt having a first end firmly securable in one of a vessel or a cover therefor, said stud bolt being dimensioned to extend through an aperture in the other of said vessel or said cover therefor, and said stud bolt having a second end positioned beyond said other of said vessel or said cover therefor when said stud bolt extends therethrough;
   a clamping nut means threaded onto said stud bolt for pressing said other of said vessel or said cover therefor against said one of said vessel or said cover therefor;
   a head firmly attached to said stud bolt at a position thereon outwardly of said clamping nut means; and
   bolt stretching means, positioned between said head and said other of said vessel or said cover therefor, for expanding upon the application of heat thereto in a direction axial of said stud bolt and for thereby stretching said bolt and moving said clamping nut means away from said other of said vessel or said cover therefor, whereby said clamping nut means may be selectively tightened or loosened.

2. A system as claimed in claim 1, wherein said bolt stretching means comprises at least one metal member having the properties of high mechanical strength and high coeficient of thermal expansion.

3. A system as claimed in claim 2, wherein said bolt stretching means comprises two said metal members, one each positioned on opposite side of said stud bolt.

4. A system as claimed in claim 2, wherein said metal member has therein passage means for receiving heating elements.

5. A system as claimed in claim 4, further comprising heating element means positioned in said passage means for heating and expanding said metal member.

6. A system as claimed in claim 2, wherein said metal member has a kidney-shaped transverse cross-sectional configuration.

7. A system as claimed in claim 2, further comprising a cross-beam positioned between said head and said metal member.

8. A system as claimed in claim 2, wherein the outer surface of said metal member comprises a layer of thermal insulating material.

9. In a pressure system of the type including a pressure vessel, a cover and means for securing said cover to and releasing said cover from said pressure vessel, the improvement wherein said securing and releasing means comprises:
   at least one stud bolt having a first end firmly secured in one of a vessel or a cover therefor, said stud bolt extending through an aperture in the other of said vessel or said cover therefore, and said stud bolt having a second end positioned beyond said other of said vessel or said cover therefor;
   a clamping nut means threaded onto said stud bolt for pressing said other of said vessel or said cover therefor against said one of said vessel or said cover therefor;
   a head firmly attached to said stud bolt at a position thereon outwardly of said clamping nut means; and
   bolt stretching means positioned between said head and said other of said vessel or said cover therefor, for expanding upon the application of heat thereto in a direction axial of said stud bolt and for thereby stretching said bolt and moving said clamping nut means away from said other of said vessel or said cover therefor, whereby said clamping nut means may be selectively tightened or loosened.

10. The improvement claimed in claim 9, wherein said bolt stretching means comprises at least one metal member having the properties of high mechanical strength and high coefficient of thermal expansion.

11. The improvement claimed in claim 10, wherein said bolt stretching means comprises two said metal members, one each positioned on opposite sides of said stud bolt.

12. The improvement claimed in claim 10, wherein said metal member has therein passage means for receiving heating elements.

13. The improvement claimed in claim 12, further comprising heating element means positioned in said passage means for heating and expanding said metal member.

14. The improvement claimed in claim 10, wherein said metal member has a kidney-shaped transverse cross-sectional configuration.

15. The improvement claimed in claim 10, wherein said at least one stud bolt comprises a plurality of stud bolts, each having associated therewith a respective clamping means, a respective head and a respective bolt stretching means; and further comprising a single cross-beam positioned between said heads and said metal members.

16. The improvement claimed in claim 10, wherein the outer surface of said metal member comprises a layer of thermal insulating material.

* * * * *